(12) United States Patent
Mustajärvi (10) Patent No.: US 11,653,256 B2
(45) Date of Patent: May 16, 2023

(54) APPARATUS, METHOD AND COMPUTER PROGRAM FOR CONTROLLING WIRELESS NETWORK CAPACITY

(71) Applicant: NOKIA SOLUTIONS AND NETWORKS OY, Espoo (FI)

(72) Inventor: Martti Mustajärvi, Helsinki (FI)

(73) Assignee: NOKIA SOLUTIONS AND NETWORKS OY, Espoo (FI)

(*) Notice: Subject to any disclaimer, the term of this patent is extended or adjusted under 35 U.S.C. 154(b) by 396 days.

(21) Appl. No.: 16/586,330

(22) Filed: Sep. 27, 2019

(65) Prior Publication Data

US 2020/0112882 A1 Apr. 9, 2020

(30) Foreign Application Priority Data

Oct. 4, 2018 (EP) .................................... 18198711

(51) Int. Cl.
*H04W 28/02* (2009.01)
*H04W 4/024* (2018.01)
(Continued)

(52) U.S. Cl.
CPC ...... *H04W 28/0289* (2013.01); *G05B 19/402* (2013.01); *H04W 4/021* (2013.01);
(Continued)

(58) Field of Classification Search
CPC ........ G05B 19/402; G05B 2219/39163; G05D 1/0022; H04L 67/12; H04W 24/02;
(Continued)

(56) References Cited

U.S. PATENT DOCUMENTS 8,612,152 B2 12/2013 Kim et al.
9,275,545 B2 3/2016 Hart, Jr. et al.
(Continued)

FOREIGN PATENT DOCUMENTS

| CN | 108462983 A | 8/2018 |
|---|---|---|
| WO | WO 2014/131439 A1 | 9/2014 |
| WO | WO 2015/049426 A2 | 4/2015 |

OTHER PUBLICATIONS

Wang, L., et al., *6.1 Data Naming in Vehicle-To-Vehicle Communications*, IEEE INFOCOM 2012 Workshop on Emerging Design Choices in Name-Oriented Networking (2012) 328-333.
(Continued)

*Primary Examiner* — Khaled M Kassim
(74) *Attorney, Agent, or Firm* — Alston & Bird LLP (57) ABSTRACT

An apparatus, methods and computer programs are provided for controlling wireless network capacity. The apparatus comprises means for: identifying one or more robots that require wireless network capacity and identifying the locations of the one or more robots that require wireless network capacity. The means may also be configured to obtain information indicative of available wireless network capacity in the locations corresponding to the locations of the one or more robots. This information could provide an indication of the likelihood of congestion within the wireless network. The means may also be configured to enable control of the location of one or more robots that require wireless network capacity so as to enable the one or more robots to maintain sufficient wireless network capacity.

20 Claims, 4 Drawing Sheets

(51) Int. Cl.
*H04W 4/029* (2018.01)
*G05B 19/402* (2006.01)
*H04W 4/021* (2018.01)

(52) U.S. Cl.
CPC ........... *H04W 4/024* (2018.02); *H04W 4/029* (2018.02); *G05B 2219/39163* (2013.01)

(58) Field of Classification Search
CPC ..... H04W 28/08; H04W 48/20; H04W 4/021; H04W 4/024; H04W 4/029; H04W 4/80; H04W 64/00; H04W 72/048; H04W 84/18; H04W 28/0289
See application file for complete search history.

(56) References Cited

U.S. PATENT DOCUMENTS

| | | | |
|---|---|---|---|
| 9,633,560 | B1 | 4/2017 | Gao et al. |
| 9,668,108 | B2 | 5/2017 | Li et al. |
| 2007/0297320 | A1* | 12/2007 | Brummette ............... F42D 5/04 370/208 |
| 2014/0136090 | A1 | 5/2014 | Yun et al. |
| 2014/0376529 | A1 | 12/2014 | Ramachandran et al. |
| 2016/0073336 | A1 | 3/2016 | Geller |
| 2016/0198484 | A1 | 7/2016 | Skarp et al. |
| 2016/0291595 | A1* | 10/2016 | Halloran ............. A47L 11/4072 |
| 2017/0151675 | A1* | 6/2017 | Shin ..................... G05D 1/0251 |
| 2017/0239816 | A1* | 8/2017 | Loughran ............. G05D 1/0022 |
| 2018/0050450 | A1* | 2/2018 | Parrott .................. B25J 9/0084 |
| 2019/0286145 | A1* | 9/2019 | LaFary ................ G05D 1/0255 |
| 2020/0222133 | A1* | 7/2020 | Shuma ................... H04L 67/12 |
| 2021/0084552 | A1* | 3/2021 | Potentas ............... H04W 36/08 |
| 2022/0066456 | A1* | 3/2022 | Ebrahimi Afrouzi ..... A47L 9/30 |

OTHER PUBLICATIONS

Extended European Search Report for European Application No. 18198711.6 dated Mar. 20, 2019, 7 pages.

Office Action for European Application No. 18198711.6 dated Oct. 5, 2021, 4 pages.

Office Action for Chinese Application No. 201910948114.1 dated Jul. 29, 2022, 18 pages.

* cited by examiner

APPARATUS, METHOD AND COMPUTER PROGRAM FOR CONTROLLING WIRELESS NETWORK CAPACITY

CROSS-REFERENCE TO RELATED APPLICATIONS

This application claims priority to European Application No. 18198711.6, filed Oct. 4, 2018, the entire contents of which are incorporated herein by reference.

TECHNOLOGICAL FIELD

Examples of the disclosure relate to an apparatus, method and computer program for controlling wireless network capacity. Some relate to an apparatus, method and computer program for controlling wireless network capacity for a plurality of robots.

BACKGROUND

Robots may be configured to perform one or more functions. For instance a robot can be configured to control a vehicle or to perform manufacturing functions in a factory or any other suitable functions. Such robots may require access to a wireless network in order to enable the robots to receive control signals from a control centre and to send data back to the control centre.

BRIEF SUMMARY

According to various, but not necessarily all, examples of the disclosure there may be provided an apparatus for controlling wireless network capacity comprising means for: identifying one or more robots that require wireless network capacity; identifying locations of one or more robots that require wireless network capacity; obtaining information indicative of available wireless network capacity in the locations corresponding to the locations of the one or more robots; and enabling the location of one or more robots that require wireless network capacity to be controlled so as to enable the one or more robots to maintain sufficient wireless network capacity.

The one or more robots may require wireless network capacity to transfer data obtained by the one or more robots to one or more control centres.

The one or more robots may require wireless network capacity to receive data and/or instructions from one or more control centres.

Controlling the location of one or more robots may comprise limiting the number of robots that use a given access point to access the wireless network.

Obtaining information about the location of the one or more robots may comprise obtaining information about the access points that the one or more robots are using to access the wireless network.

Obtaining information indicative of available wireless network capacity in the locations corresponding to the locations of the one or more robots may comprise obtaining measurements of wireless network capacity in one or more locations.

Obtaining information indicative of available wireless network capacity in the locations corresponding to the locations of the one or more robots may comprise obtaining information about the number of robots using an access point to access the wireless network.

Identifying locations of one or more robots that require wireless network capacity may comprise obtaining information about a change in location of one or more robots.

The means may also be configured to determine one or more robots that do not require wireless network capacity and enabling the one or more robots that do not require wireless network capacity to move freely within the area covered by the wireless network.

According to various, but not necessarily all, examples of the disclosure there may be provided a system comprising an apparatus as claimed in any preceding claim and one or more robots.

According to various, but not necessarily all, examples of the disclosure there may be provided a method for controlling wireless network capacity comprising: identifying one or more robots that require wireless network capacity;

identifying locations of one or more robots that require wireless network capacity;

obtaining information indicative of available wireless network capacity in the locations corresponding to the locations of the one or more robots; and enabling the location of one or more robots that require wireless network capacity to be controlled so as to enable the one or more robots to maintain sufficient wireless network capacity.

The one or more robots may require wireless network capacity to transfer data obtained by the one or more robots to one or more control centres and/or to receive data and/or instructions from one or more control centres.

Controlling the location of one or more robots may comprise limiting the number of robots that use a given access point to access the wireless network.

According to various, but not necessarily all, examples of the disclosure there may be provided a computer program comprising computer program instructions that, when executed by processing circuitry, cause: identifying one or more robots that require wireless network capacity; identifying locations of one or more robots that require wireless network capacity; obtaining information indicative of available wireless network capacity in the locations corresponding to the locations of the one or more robots; and enabling the location of one or more robots that require wireless network capacity to be controlled so as to enable the one or more robots to maintain sufficient wireless network capacity.

The one or more robots may require wireless network capacity to transfer data obtained by the one or more robots to one or more control centres and/or to receive data and/or instructions from one or more control centres.

BRIEF DESCRIPTION

Some example embodiments will now be described with reference to the accompanying drawings in which.

DETAILED DESCRIPTION

Examples of the disclosure relate to an apparatus 101, method and computer program for controlling wireless network capacity for a plurality of robots 203. The method may comprise identifying one or more robots 203 that require wireless network capacity and identifying the locations of the one or more robots 203 that require wireless network capacity. The method may also comprise obtaining information indicative of available wireless network capacity in the locations corresponding to the locations of the one or more robots 203. This information could provide an indication of the likelihood of congestion within the wireless network. The congestion could be disadvantageous as this may affect the transfer of information between the one or more robots 203 and one or more control centres 205. Therefore the available wireless network capacity may affect whether or not the robots 203 can correctly perform the functions that have been assigned to them. The method may therefore also comprise enabling the location of one or more robots 203 that require wireless network capacity to be controlled so as to enable the one or more robots 203 to maintain sufficient wireless network capacity. This ensures that the robots 203 can continue to exchange information with the one or more control centres 205 and ensures that they are able to perform the functions that they have been assigned.

Figure 1:
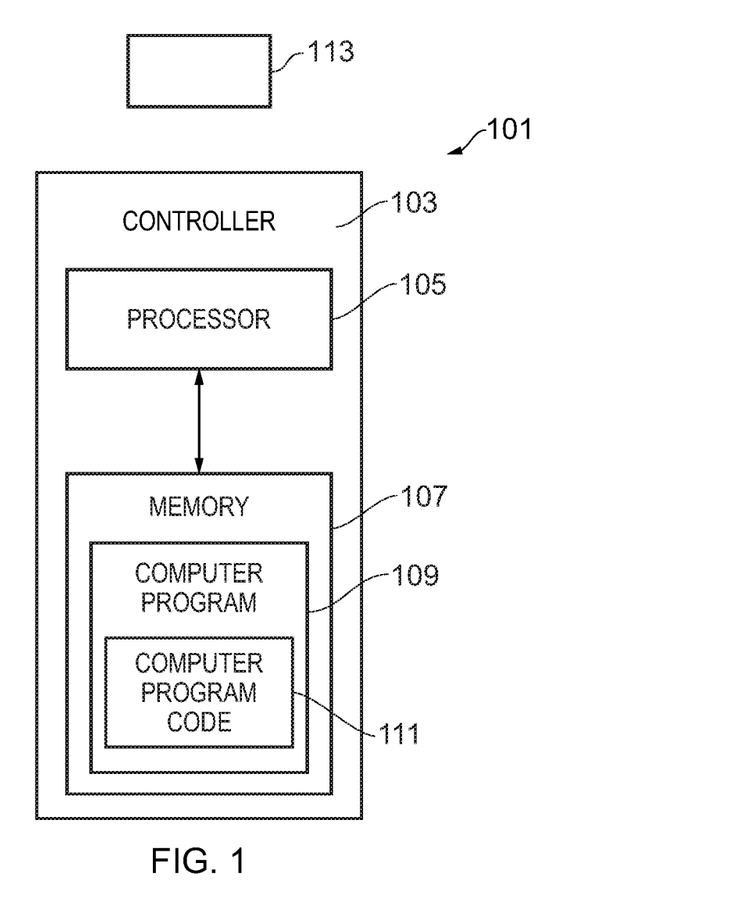
FIG. 1 illustrates an example apparatus.

FIG. 1 schematically illustrates an apparatus 101 according to examples of the disclosure. The apparatus 101 could be configured to control wireless network capacity for a plurality of robots 203. In some examples the apparatus 101 could be provided in one or more control centers 205 which may be configured to control the one or more robots 203. In some examples the apparatus 101 could be provided in a network control centre 207 which could be configured to control the wireless network. The apparatus 101 may be provided in other locations in other examples of the disclosure.

In the example of FIG. 1 the apparatus 101 comprises a controller 103. In the example of FIG. 1 the implementation of the controller 103 may be as controller circuitry. In some examples the controller 103 may be implemented in hardware alone, have certain aspects in software including firmware alone or can be a combination of hardware and software (including firmware).

As illustrated in FIG. 1 the controller 103 may be implemented using instructions that enable hardware functionality, for example, by using executable instructions of a computer program 109 in a general-purpose or special-purpose processor 105 that may be stored on a computer readable storage medium (disk, memory etc) to be executed by such a processor 105.

The processor 105 is configured to read from and write to the memory 107. The processor 105 may also comprise an output interface via which data and/or commands are output by the processor 105 and an input interface via which data and/or commands are input to the processor 105.

The processor 105 may be configured to process data. The processing of the data by the processor 105 may be for the purpose of controlling wireless network capacity for a plurality of robots 203. In some examples the processing of the data, may involve artificial intelligence or machine learning algorithms. The data may, for example, be used as learning input to train a machine learning network or may be used as a query input to a machine learning network, which provides a response. The machine learning network may for example use linear regression, logistic regression, vector support machines or an acyclic machine learning network such as a single or multi hidden layer neural network.

The memory 107 is configured to store a computer program 109 comprising computer program instructions (computer program code 111) that controls the operation of the apparatus 101 when loaded into the processor 105. The computer program instructions, of the computer program 109, provide the logic and routines that enables the apparatus 101 to perform the methods illustrated in FIG. 3. The processor 105 by reading the memory 107 is able to load and execute the computer program 109.

Figure 3:
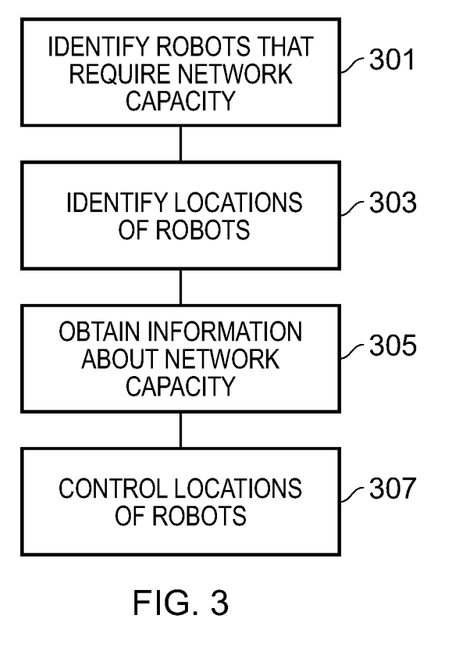
FIG. 3 illustrates an example method.

The apparatus 101 therefore comprises: at least one processor 105; and at least one memory 107 including computer program code 111, the at least one memory 107 and the computer program code 111 configured to, with the at least one processor 105, cause the apparatus 101 at least to perform: identifying 301 one or more robots 203 that require wireless network capacity; identifying 303 locations of one or more robots 203 that require wireless network capacity; obtaining 305 information indicative of available wireless network capacity in the locations corresponding to the locations of the one or more robots 203; and enabling 307 the location of one or more robots 203 that require wireless network capacity to be controlled so as to enable the one or more robots 203 to maintain sufficient wireless network capacity.

As illustrated in FIG. 1 the computer program 109 may arrive at the apparatus 101 via any suitable delivery mechanism 113. The delivery mechanism 113 may be, for example, a machine readable medium, a computer-readable medium, a non-transitory computer-readable storage medium, a computer program product, a memory device, a record medium such as a Compact Disc Read-Only Memory (CD-ROM) or a Digital Versatile Disc (DVD) or a solid state memory, an article of manufacture that comprises or tangibly embodies the computer program 109. The delivery mechanism may be a signal configured to reliably transfer the computer program 109. The apparatus 101 may propagate or transmit the computer program 109 as a computer data signal. In some examples the computer program 109 may be transmitted to the apparatus 101 using a wireless protocol such as Bluetooth, Bluetooth Low Energy, Bluetooth Smart, 6LoWPan ($IP_v6$ over low power personal area networks) ZigBee, ANT+, near field communication (NFC), Radio frequency identification, wireless local area network (wireless LAN) or any other suitable protocol.

The computer program 109 comprises computer program instructions for causing an apparatus 101 to perform at least the following: identifying 301 one or more robots that require wireless network capacity; identifying 301 one or more robots 203 that require wireless network capacity; identifying 303 locations of one or more robots 203 that require wireless network capacity; obtaining 305 information indicative of available wireless network capacity in the locations corresponding to the locations of the one or more robots 203; and enabling 307 the location of one or more robots 203 that require wireless network capacity to be controlled so as to enable the one or more robots 203 to maintain sufficient wireless network capacity.

The computer program instructions may be comprised in a computer program 109, a non-transitory computer readable medium, a computer program product, a machine readable medium. In some but not necessarily all examples, the computer program instructions may be distributed over more than one computer program 109.

Although the memory 107 is illustrated as a single component/circuitry it may be implemented as one or more separate components/circuitry some or all of which may be integrated/removable and/or may provide permanent/semi-permanent/dynamic/cached storage.

Although the processor 105 is illustrated as a single component/circuitry it may be implemented as one or more separate components/circuitry some or all of which may be integrated/removable. The processor 105 may be a single core or multi-core processor.

References to "computer-readable storage medium", "computer program product", "tangibly embodied computer program" etc. or a "controller", "computer", "processor" etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term "circuitry" may refer to one or more or all of the following:

(a) hardware-only circuitry implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions and (c) hardware circuit(s) and or processor(s), such as a microprocessor(s) or a portion of a microprocessor(s), that requires software (e.g. firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor and its (or their) accompanying software and/or firmware. The term circuitry also covers, for example and if applicable to the particular claim element, a baseband integrated circuit for a mobile device or a similar integrated circuit in a server, a cellular network device, or other computing or network device.

Figure 2:
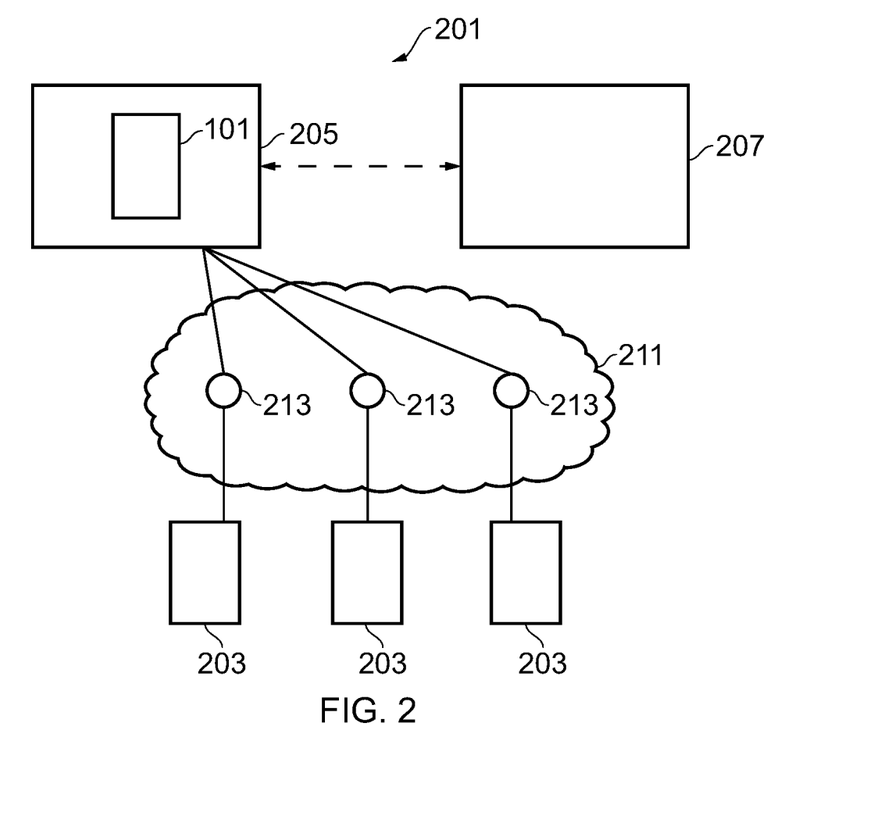
FIG. 2 illustrates an example system.

FIG. 2 illustrates an example system 201 which may be used to implement examples of the disclosure. The system 201 comprises an apparatus 101 and a plurality of robots 203. In the example of FIG. 2 the system 201 also comprises a robot control centre 205 and a network control centre 207. The system 201 could comprise other components in other examples of the disclosure.

In the example of FIG. 2 the system 201 comprises three robots 203. It is to be appreciated that the system 201 could comprise any suitable number of robots 203. The robots 203 comprise any devices which may be configured to be controlled automatically and/or remotely to perform one or more functions. When a robot 203 is controlled automatically it may have instructions stored in a memory and may perform the one or more functions in accordance with the stored instructions. When a robot 203 is controlled remotely the robot 203 may receive instructions from a remote device such as the robot control centre 205. The robot 203 may then perform the one or more functions in accordance with the received instructions.

One or more of the robots 203 may be moveable. The robots 203 may be moveable so that the location of the robot 203 can be changed. This may enable the robot 203 to move from a first location to second location within an area covered by a wireless network 211. The movement of the robot 203 may enable the robot 203 to switch between different access points 213 to access the wireless network 211.

In some examples one or more of the robots 203 could comprise a vehicle. The vehicle could be an autonomous vehicle. The functions that are performed by the vehicle robot 203 could be maneuvering the vehicle so as to avoid collisions, obtaining sensor data that can be used by other autonomous vehicles and/or any other suitable functions.

In some examples one or more of the robots 203 could be a machine which is configured to perform one or more functions in an industrial setting. For instance, the robots 203 could be used in a factory to perform functions such as manufacturing or assembling products. In such examples some of the robots 203 could be assigned tasks relating to manufacturing or assembling or moving goods.

In some examples the robots 203 could be provided within a mine or quarry and could be configured to enable natural resources such as coal or other minerals to be extracted from the mine or quarry. In such examples some of the robots 203 could be performing functions of extracting the natural resources and some robots 203 could be obtaining sensor data relating to the area from which the resources are being extracted.

It is to be appreciated that the examples of robots 203 and the uses of the robots 203 that have been given are for illustrative purposes and that examples of the disclosure could be applied to other types robots 203 and other functions in other examples of the disclosure.

The robots 203 may be configured to communicate with a robot control centre 205. The robot control centre 205 could comprise any means which may be configured to control the tasks and functions that are performed by the robots 205. For instance the robot control centre 205 may control the tasks and functions that are assigned to the robots 205, the robot control centre 205 may control the timing of the tasks and functions that are performed by the robots 205 and any other suitable factors.

In some examples the robot control centre 205 may comprise a user interface which enables a user to control one or more of the robots 203 remotely. The user interface could comprise a display which may enable information and images to be displayed to the user. The user interface could comprise a user input device which may enable the user to control the tasks assigned to one or more of the robots 203. In other examples the robot control centre 205 might not comprise any user interface and the robot control centre 205 could be configured to control the one or more robots 203 automatically without any user input.

The robot control centre 205 may be configured to transfer information with the one or more robots 203. The transfer of information could enable the remote control of the robots 203 by the robot control centre 205. The transfer of information between the robot control centre 205 and the one or more robots 203 may ensure that the tasks assigned to the robots 203 are performed correctly. It may also enable tasks assigned to the robots 203 to be changed and/or updated.

In some examples the data that is transferred between the robots 203 and the robot control centre 205 could comprise data and/or instructions that are sent from the robot control centre 205 to the one or more robots 203. The data and/or instructions may enable the tasks and functions that are performed by the robots 203 to be controlled, for instance it may control the tasks that are performed by particular robot 203, the timing of the tasks, the manner in which a task is to be performed, the location of the robot 203 or any other suitable task or function.

In some examples the data that is transferred between the robot control centre 205 and the one or more robots 203 may comprise data that has been obtained by one or more of the robots 203. For instance it may comprise data that is obtained by one or more sensors on the robots 203. The sensor data could comprise any data that could be used by the robot control centre 205 to control the robots 203. In some examples sensor data could comprise images and/or videos that are obtained by an image sensor. This could be used to analyse the area in which the robots 203 are performing their functions. In some examples these images and/or videos could be displayed to a user at the robot control centre 205.

In some examples the sensor data obtained by the one or more robots 203 could comprise data for detecting objects around the robots 203. For instance the sensors could be ultrasonic sensors, capacitive sensors, photoelectric sensors or any other suitable types of object sensors. This information could be used by the robot control centre 205 to inform other robots 203 about the location of the object. This information could be used, for example, to help the robots 203 avoid colliding with the object.

Other types of sensors and data could be used in other examples of the disclosure, for instance the sensor could obtain information about the environment in which the robots 203 are located. Such information could comprise temperature, light levels, humidity, presence of particular chemicals or analytes or any other suitable information. In some examples the information that is provided by the robots 203 to the robot control centre 205 could comprise an indication of the status of a task, for example, it could comprise information indicating that a task has been completed or could not be completed or any other suitable information.

The robot control centre 205 may be configured so that once the robot control centre 205 has obtained information from the one or more robots 203 the robot control centre 205 can send this data to other robots 203 or can process the data to send control signals to other robots 203. For instance, the data obtained from the robots 203 could cause the robot control centre 205, or a user at the robot control centre 205, to change the task or timing of the tasks that have been assigned to the other robots 203.

In examples of the disclosure the information is transferred between the robots 203 and the robot control centre 205 via the wireless network 211. In such examples each of the robots 203 that requires data to be received from the robot control centre 205 and/or is required to send data to the robot control centre 205 requires some wireless network capacity.

The wireless network 211 comprises a network control centre 207. The network control centre 207 may comprise any means which may be configured to control the wireless network 211. In some examples the network control centre 207 may comprise information about the wireless network 211. For example, it may comprise information about the location of robots 203 or other users of the wireless network 211, information about the number and location of one or more access points 213, information about the location of one or more robots 203 relative to the access points 213 or any other suitable information. The network control centre 207 may be configured to provide this information to the robot control centre 205.

The wireless network 211 could comprise any suitable type of network such as a cellular network, Bluetooth network, Bluetooth Low Energy network, Bluetooth Smart, 6LoWPan ($IP_v6$ over low power personal area networks), ZigBee network, ANT+ network, near field communication (NFC) network, Radio frequency identification network, wireless local area network (wireless LAN) network or any other suitable network.

In the example shown in FIG. 2 the wireless network 211 comprises a plurality of access points 213. The access points 213 can comprise any points which enable the robots 203 to connect to the wireless network 211 and exchange data and/or information with the robot control centre 205. The type of access point 213 that is used may depend on the type of wireless network 211 that is used. For instance, where the robots 203 comprise vehicles the robots 203 could communicate with a robot control centre 205 via a cellular network. In such examples the access points 213 could comprise base stations that are located in different areas covered by the wireless network 211.

The plurality of access points 213 may be located at different positions within the wireless network 211. The access point that is used by a robot 203 to communicate with the robot control centre 205 may depend on the location of the robot 203. For instance the robot 203 may use the access point 213 that is closest to their current location. If the robot 203 changes location then the access point 213 used to access the wireless network 211 may also change. For instance, if the robot 203 moves away from the access point 213 then the network control centre 207 may control a handover to a new access point 213. In some examples each access point 213 may only be configured to establish a network connection with a limited number of robots 203. This may limit the number of robots 203 that can access the wireless network 211 in a given region. As some of the robots 203 require the network connection in order to communicate with the robot control centre 205 and function correctly the limitations on the wireless network capacity may affect the control of the robots 203.

In the example system 201 shown in FIG. 2 the robot control centre 205 comprises an apparatus 101. The apparatus 101 may be as shown in FIG. 1 and may be configured to help to control the wireless network capacity. In some examples the apparatus 101 could be located somewhere other than in the robot control centre 205. For instance the apparatus 101 could be provided in the network control centre 207 or in any other suitable location.

The apparatus 101 could be configured to control the wireless network capacity using the method shown in FIG. 3 or any other suitable method.

The example method shown in FIG. 3 comprises identifying 301 one or more robots 203 that require wireless network capacity. The robots 203 that require wireless network capacity could comprise any robots 203 that are required to exchange information with the robot control centre 205 or that are required to exchange information with other devices within the wireless network 211. In some examples the robots 203 may be required to receive control signals, or to be capable of receiving control signals from the robot control centre 205. For instance, in some examples the robot 203 may need to receive control signals from the robot control centre 205 in order to perform the task or tasks assigned to it.

In other examples a robot 203 may be configured to complete a task assigned to it without any remote instruction from the robot control centre 205. However the robot 203 may still need to be capable of receiving further information from the robot control centre 205 in case the task assigned needs to be changed. For instance the robot control centre 205 might need to send an override signal which could be used to stop the robots 203 if it is determined that an error has occurred.

In some examples a task assigned to a robot 203 could be to obtain information that is to be transmitted to the robot control centre 205 or to be transmitted to other devices within the wireless network 211. For instance, the robot 203 could be configured to obtain information that is then provided to the robot control centre 205 and used to control the other robots 203 within the system 201.

In some examples the apparatus 101 may obtain information indicating the amount of wireless network capacity required by the different robots 203. This information could be stored in the memory 107 of the apparatus 101 and may be used to identify the one or more robots 203 that require wireless network capacity. The amount of wireless network capacity that is required by a robot 203 may be dependent upon the tasks that are to be performed by the robot 203 and/or any other suitable factors. For instance a robot 203 that is required to exchange video images with the robot control centre 205 may require more wireless network capacity than a robot 203 which only needs to receive a control signal.

At block 303 the method comprises identifying locations of one or more robots 203 that require wireless network capacity. Any suitable means may be used to determine the locations of the robots 203. In some examples the locations 203 of the robots 203 could be identified using positioning means or sensors that are provided within the robot 203 itself. For instance the robot 203 could have a GPS (global positioning sensor) or any other suitable means. In such examples the locations could be transferred from the robots 203 to the robot control centre 205.

In other examples the locations of the robots 203 could be obtained from the network control centre 207. In such examples the network control centre 207 may comprise information about the robots 203 that are using the respective access points 213 to access the wireless network 211. This may provide sufficient location information for the purposes of controlling the wireless network capacity.

In some examples identifying 303 locations of one or more robots 203 that require wireless network capacity may comprise obtaining information about a change in location of one or more robots 203. For instance it may comprise information indicating that robot 203 is moving out of range of an access point 213. In some examples the robots 203 could be tracked so that the locations of the robots 203 are monitored as the robots 203 move between different locations. In some examples the monitoring of the locations could be continuous. In some examples the monitoring of the locations could be at regular intervals.

At block 305 the method comprises obtaining information indicative of available wireless network capacity in the locations corresponding to the locations of the one or more robots 203. The information indicative of available wireless network capacity may provide an indication of the reliability of a wireless network connection between the robot control centre 205 and the robots 203, the bandwidth available between the robot control centre 205 and the robots 203 and/or any other suitable information.

In some examples the block 305 of obtaining information indicative of available wireless network capacity in the locations corresponding to the locations of the one or more robots 203 may comprise obtaining information about the number of robots 203 using the respective access points 213 to access the wireless network 211. This information could be obtained from the network control centre 207.

In some examples the block 305 of obtaining information indicative of available wireless network capacity in the locations corresponding to the locations of the one or more robots 203 could comprise obtaining measurements of wireless network capacity in one or more locations. In some examples the measurements of the wireless network capacity could be made by a robot 203 or by a fixed device or by any other suitable means.

In some examples the measurements of the wireless network capacity could be obtained from the network control centre 207. For instance the network control centre 207 could store map information which comprises information indicative of the location of the access points 213 and the one or more robots 203. This information could be provided to the apparatus 101 in order to enable the apparatus 101 to obtain information indicative of available wireless network capacity In other examples the measurements of the wireless network capacity could be transmitted directly from the measuring device to the apparatus 101. For instance the measurements could be sent to the apparatus 101 and the apparatus 101 could then determine the wireless network capacity from the obtained measurements.

At block 307 the method comprises enabling the location of one or more robots 203 that require wireless network capacity to be controlled so as to enable the one or more robots 203 to maintain sufficient wireless network capacity. Controlling the locations of the one or more robots 203 may comprise enabling the robot control centre 205 to transmit a control signal to the one or more robots 203 to control the locations of the robots 203. The control signal 203 could cause movement of the robots 203 from the current location to a new location or could cause the robot 203 to remain in the current location. The locations of the robots 203 could be controlled so as to limit the number of robots 203 in any respective area so as to prevent too many robots 203 from trying to access the wireless network 211 from the same locations. For instance, where an access point 213 can only enable a limited number of robots 203 to access the network, the locations of the robots 203 may be controlled so that the limited number is not exceeded. This ensures that all of the robots 203 that need to exchange information with the robot control centre 205 have the facilities to enable this exchange.

In some examples the locations of the robots 203 may be controlled so that the combined capacity requirements of the robots 203 do not exceed the capacity of the access points 213 that the robots 203 are using. As different robots 203 may have different capacity requirements this could enable different access points 213 to be used by different numbers of robots 203.

In some examples predicted future locations of the robots 203 could be used to control the locations of the robots 203. The predicted future locations of the robots 203 could be predicted based on the tasks assigned to a robot 203, the current trajectory of a robot 203 or any other suitable factor. Any suitable means such as artificial intelligence or machine learning could be used to make the predictions of the future locations. The information about the predicted future locations could be used to change the position of one or more robots 203 so as to ensure that sufficient network capacity is available at a future point in time.

In some examples predicted future capacity requirements of the robots 203 could be used to control the locations of the robots 203. The predicted future capacity requirements of the robots 203 could be predicted based on the tasks that have been assigned to the robots 203, the tasks that have already been completed by the robots 203 or any other suitable factor. For instance once a robot 203 has completed a task the network capacity requirements 203 could decrease, or a new task could be allocated to the robot 203 which may increase the network capacity requirements of the robot 203. The information about the predicted future capacity requirements could be used to change the position of one or more robots 203 so as to ensure that sufficient network capacity is available at a future point in time.

It is to be appreciated that the method could comprise other blocks that are not shown in FIG. 3. For instance in some examples the method could also comprise determining one or more robots 203 that do not require wireless network capacity and enabling the one or more robots 203 that do not require wireless network capacity to move freely within the area covered by the wireless network 211. In such examples the robot control centre 205 may distinguish between robots 203 that need to exchange information with the robot control centre 205 and robots 203 that do not need to exchange information with the robot control centre 205. For instance if the robot 203 has all of the information that it requires to complete an assigned task stored in a memory it may be able to complete this task without any further information from the robot control centre 205 and so does not require any wireless network capacity. As an example, a cleaning robot could be provided in a factory which may be configured to remove dirt from the floor. This could be independent of the robots 203 that perform the manufacturing or assembling tasks and so does not need to be controlled by the robot control centre 205. In such examples the cleaning robot can move freely within the area covered by the wireless network 211 as it is not affected by the availability of the wireless network 211. In such examples the total number of robots 203 within a given area is not limited, however the total number of robots 203 that require wireless network capacity and can be located within a given area is limited.

Figure 4A:
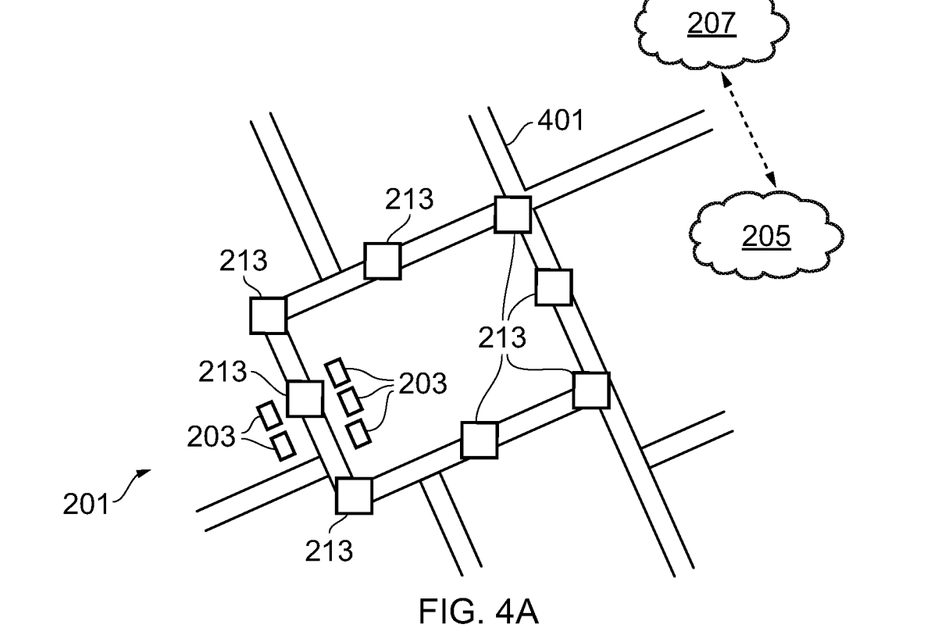
FIGS. 4A and 4B illustrate example systems.
Figure 4B:
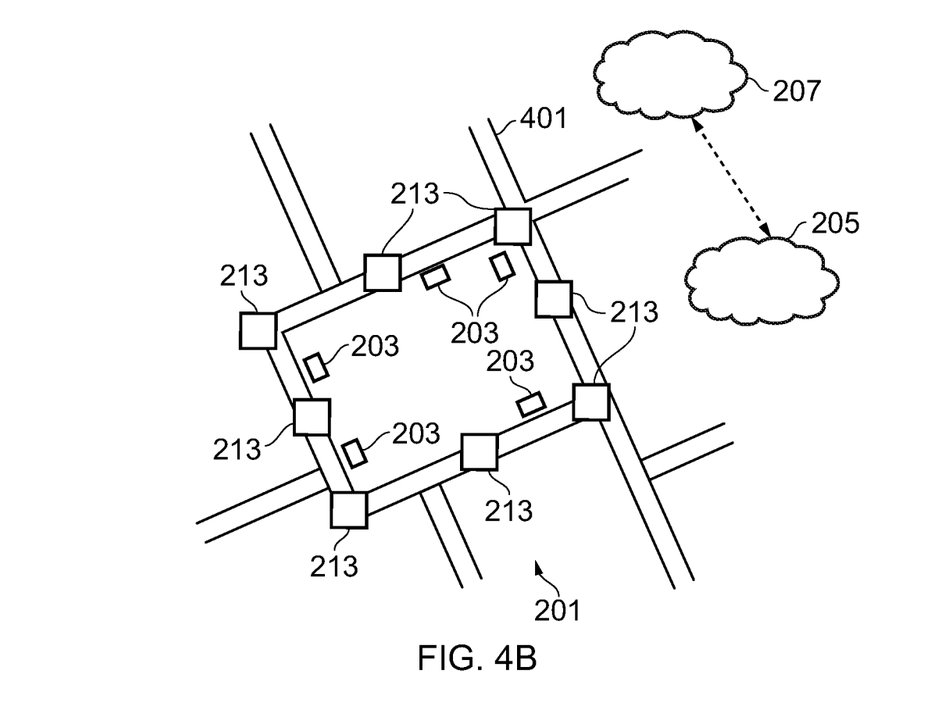

FIGS. 4A and 4B illustrate example systems 201. FIGS. 4A and 4B show a map of streets 401 through which a plurality of vehicle robots 203 are travelling. The vehicle robots 203 may be controlled by the robot control centre 205.

A plurality of access points 213 may be distributed around the streets 401. The plurality of access points 213 could comprise base stations or any other suitable means that enable the vehicle robots 203 to establish a wireless network connection with the robot control centre 205. In the examples shown in FIGS. 4A and 4B eight access points 213 are provided, it is to be appreciated that other numbers of access points 213 could be provided in other examples of the disclosure.

In the example shown in FIG. 4A all of the vehicle robots 203 are clustered around a single access point 213. The number of vehicle robots 203 that are located close to the single access point 213 could exceed the number or robots 203 that the access point is capable of handling. This could leave some of the vehicle robots 203 unable to establish and/or maintain communication with the robot control centre 205.

In FIG. 4B the method shown in FIG. 3 has been followed. Information indicating the location of the vehicle robots 203 and the access points 213 is provided to the robot control centre 205. This information may be obtained from the network control centre.

In response to receiving this information the robot control centre 205 has sent one or more control signals to the vehicle robots 203 which has caused the robots 203 to move so that they are more evenly spread out though the streets. In the example shown in FIG. 4B only one robot 203 is close to any single access point 213. This may be less than the maximum number of robots 203 that the access point 213 can handle and so this ensures that each of the vehicle robots 203 can maintain a network connection with the robot control centre 205. This may therefore ensure that the robots 203 can continue to exchange information with the robot control centre 205 and ensures that the robots perform their assigned tasks correctly. It is to be appreciated that in other examples there could be more than one robot 203 connected to any given access point 213, however the number could be limited to ensure that the combined network capacity requirements do not exceed the capacity of the access point 213.

In some examples one or more of the robots 203 could measure the network quality and capacity while the robot 203 moves within the network area. This information could then be provided to the network control centre 207. The network control centre 207 can store and analyse the measurement data obtained from the robots 203 and use the measurement data to control the locations of the robots 203 so as to ensure sufficient network capacity is provided. The measurements made by the robots 203 could be useful to enable temporary conditions to be taken into account when allocating the locations of the robots 203. For example, the measurements could enable degradation in network performance, due to weather conditions, moving metal obstacles or any other suitable factor, to be taken into account.

In some examples the systems 201, apparatus 101, methods and computer programs may use machine learning which can include statistical learning. Machine learning is a field of computer science that gives computers the ability to learn without being explicitly programmed. The computer learns from experience E with respect to some class of tasks T and performance measure P if its performance at tasks in T, as measured by P, improves with experience E. The computer can often learn from prior training data to make predictions on future data. Machine learning includes wholly or partially supervised learning and wholly or partially unsupervised learning. It may enable discrete outputs (for example classification, clustering) and continuous outputs (for example regression). Machine learning may for example be implemented using different approaches such as cost function minimization, artificial neural networks, support vector machines and Bayesian networks for example. Cost function minimization may, for example, be used in linear and polynomial regression and K-means clustering. Artificial neural networks, for example with one or more hidden layers, model complex relationship between input vectors and output vectors. Support vector machines may be used for supervised learning. A Bayesian network is a directed acyclic graph that represents the conditional independence of a number of random variables.

The above described examples find application as enabling components of: automotive systems; autonomous automotive systems; manufacturing systems; mining systems; media systems for generating or rendering media content including audio, visual and audio visual content and mixed, mediated, virtual and/or augmented reality; and related software and services.

The term 'comprise' is used in this document with an inclusive not an exclusive meaning. That is any reference to X comprising Y indicates that X may comprise only one Y or may comprise more than one Y. If it is intended to use 'comprise' with an exclusive meaning then it will be made clear in the context by referring to 'comprising only one . . . ' or by using 'consisting'.

In this description, reference has been made to various examples. The description of features or functions in relation to an example indicates that those features or functions are present in that example. The use of the term 'example' or 'for example' or 'can' or 'may' in the text denotes, whether explicitly stated or not, that such features or functions are present in at least the described example, whether described as an example or not, and that they can be, but are not necessarily, present in some of or all other examples. Thus 'example', 'for example', 'can' or 'may' refers to a particular instance in a class of examples. A property of the instance can be a property of only that instance or a property of the class or a property of a sub-class of the class that includes some but not all of the instances in the class. It is therefore implicitly disclosed that a feature described with reference to one example but not with reference to another example, can where possible be used in that other example as part of a working combination but does not necessarily have to be used in that other example.

Although embodiments have been described in the preceding paragraphs with reference to various examples, it should be appreciated that modifications to the examples given can be made without departing from the scope of the claims.

Features described in the preceding description may be used in combinations other than the combinations explicitly described above.

Although functions have been described with reference to certain features, those functions may be performable by other features whether described or not.

Although features have been described with reference to certain embodiments, those features may also be present in other embodiments whether described or not.

The term 'a' or 'the' is used in this document with an inclusive not an exclusive meaning. That is any reference to X comprising a/the Y indicates that X may comprise only one Y or may comprise more than one Y unless the context clearly indicates the contrary. If it is intended to use 'a' or 'the' with an exclusive meaning then it will be made clear in the context. In some circumstances the use of 'at least one' or 'one or more' may be used to emphasis an inclusive meaning but the absence of these terms should not be taken to infer and exclusive meaning.

The presence of a feature (or combination of features) in a claim is a reference to that feature) or combination of features) itself and also to features that achieve substantially the same technical effect (equivalent features). The equivalent features include, for example, features that are variants and achieve substantially the same result in substantially the same way. The equivalent features include, for example, features that perform substantially the same function, in substantially the same way to achieve substantially the same result.

In this description, reference has been made to various examples using adjectives or adjectival phrases to describe characteristics of the examples. Such a description of a characteristic in relation to an example indicates that the characteristic is present in some examples exactly as described and is present in other examples substantially as described.

The use of the term 'example' or 'for example' or 'can' or 'may' in the text denotes, whether explicitly stated or not, that such features or functions are present in at least the described example, whether described as an example or not, and that they can be, but are not necessarily, present in some of or all other examples. Thus 'example', 'for example', 'can' or 'may' refers to a particular instance in a class of examples. A property of the instance can be a property of only that instance or a property of the class or a property of a sub-class of the class that includes some but not all of the instances in the class. It is therefore implicitly disclosed that a feature described with reference to one example but not with reference to another example, can where possible be used in that other example as part of a working combination but does not necessarily have to be used in that other example Whilst endeavoring in the foregoing specification to draw attention to those features believed to be of importance it should be understood that the Applicant may seek protection via the claims in respect of any patentable feature or combination of features hereinbefore referred to and/or shown in the drawings whether or not emphasis has been placed thereon.

The invention claimed is:

1. An apparatus for controlling wireless network capacity, the apparatus comprising at least one processor and at least one memory including computer program code, the at least one memory and the computer program code configured to, with the at least one processor, cause the apparatus at least to perform:
   identifying one or more robots that require wireless network capacity;
   identifying a current location for the one or more robots that require wireless network capacity;
   obtaining information indicative of available wireless network capacity in locations corresponding to the current locations of the one or more robots; and
   enabling movement of the one or more robots that require wireless network capacity to be controlled causing the one or more robots to move from their respective current location to another location so as to enable the one or more robots to maintain sufficient wireless network capacity,
   wherein the another location for the one or more robots is determined based at least on the current location of the robot, one or more predicted locations of the other one or more robots, and a measurement corresponding to an expected impact of the one or more robots on the wireless network capacity, wherein the measurement is taken by the one or more robots as they move through the current location.

2. An apparatus as claimed in claim 1 wherein the one or more robots require wireless network capacity to transfer data obtained by the one or more robots to one or more control centres.

3. An apparatus as claimed in claim 1 wherein the one or more robots require wireless network capacity to receive data and/or instructions from one or more control centres.

4. An apparatus as claimed in claim 1 wherein the at least one memory and the computer program code are configured to, with the at least one processor, cause the apparatus to control the movement of one or more robots by limiting the number of robots that use a given access point to access the wireless network.

5. An apparatus as claimed in claim 1 wherein the at least one memory and the computer program code are configured to, with the at least one processor, cause the apparatus to obtain information about the current locations of the one or more robots by obtaining information about the access points that the one or more robots are using to access the wireless network.

6. An apparatus as claimed in claim 1 wherein the at least one memory and the computer program code are configured to, with the at least one processor, cause the apparatus to obtain information indicative of available wireless network capacity in the locations corresponding to the current locations of the one or more robots by obtaining measurements of wireless network capacity in one or more locations.

7. An apparatus as claimed in claim 1 wherein the at least one memory and the computer program code are configured to, with the at least one processor, cause the apparatus to obtain information indicative of available wireless network capacity in the locations corresponding to the current locations of the one or more robots by obtaining information about the number of robots using an access point to access the wireless network.

8. An apparatus as claimed in claim 1 wherein the at least one memory and the computer program code are configured to, with the at least one processor, cause the apparatus to identify current locations of one or more robots that require wireless network capacity by obtaining information about a change in location of one or more robots.

9. An apparatus as claimed in claim 1 wherein the at least one memory and the computer program code are also configured to, with the at least one processor, cause the apparatus to determine one or more robots that do not require wireless network capacity and to enable the one or more robots that do not require wireless network capacity to move freely within the area covered by the wireless network.

10. A system comprising an apparatus as claimed in claim 1 and one or more robots.

11. A method for controlling wireless network capacity comprising:
   identifying one or more robots that require wireless network capacity;
   identifying a current location for the one or more robots that require wireless network capacity;
   obtaining information indicative of available wireless network capacity in locations corresponding to the current locations of the one or more robots; and
   enabling movement of the one or more robots that require wireless network capacity to be controlled causing the one or more robots to move from their respective current location to another location so as to enable the one or more robots to maintain sufficient wireless network capacity,
      wherein the another location for the one or more robots is determined based at least on the current location of the robot, one or more predicted locations of the other one or more robots, and a measurement corresponding to an expected impact of the one or more robots on the wireless network capacity, wherein the measurement is taken by the one or more robots as they move through the current location.

12. A method as claimed in claim 11 wherein the one or more robots require wireless network capacity to transfer data obtained by the one or more robots to one or more control centres and/or to receive data and/or instructions from one or more control centres.

13. A method as claimed in claim 12 wherein controlling the movement of one or more robots comprises limiting the number of robots that use a given access point to access the wireless network.

14. A method as claimed in claim 11 wherein obtaining information about the current location for the one or more robots comprises obtaining information about the access points that the one or more robots are using to access the wireless network.

15. A method as claimed in claim 11 wherein obtaining information indicative of available wireless network capacity in the locations corresponding to the current locations of the one or more robots comprises obtaining measurements of wireless network capacity in one or more locations.

16. A method as claimed in claim 11 wherein obtaining information indicative of available wireless network capacity in the locations corresponding to the current locations of the one or more robots comprises obtaining information about the number of robots using an access point to access the wireless network.

17. A method as claimed in claim 11 wherein identifying current locations of one or more robots that require wireless network capacity comprises obtaining information about a change in location of one or more robots.

18. A method as claimed in claim 11 further comprising determining one or more robots that do not require wireless network capacity and enabling the one or more robots that do not require wireless network capacity to move freely within the area covered by the wireless network.

19. A non-transitory computer readable medium storing computer program instructions that, when executed by processing circuitry, cause:
   identifying one or more robots that require wireless network capacity;
   identifying a current location for the one or more robots that require wireless network capacity;
   obtaining information indicative of available wireless network capacity in locations corresponding to the current locations of the one or more robots; and
   enabling movement of the one or more robots that require wireless network capacity to be controlled causing the one or more robots to move from their respective current location to another location so as to enable the one or more robots to maintain sufficient wireless network capacity,
      wherein the another location for the one or more robots is determined based at least on the current location of the robot, one or more predicted locations of the other one or more robots, and a measurement corresponding to an expected impact of the one or more robots on the wireless network capacity, wherein the measurement is taken by the one or more robots as they move through the current location.

20. A non-transitory computer readable medium as claimed in claim 19 wherein the one or more robots require wireless network capacity to transfer data obtained by the one or more robots to one or more control centres and/or to receive data and/or instructions from one or more control centres.

* * * * *